(12) United States Patent
Kuroda et al.

(10) Patent No.: US 6,603,720 B1
(45) Date of Patent: Aug. 5, 2003

(54) OPTICAL DISC DISCRIMINATING SYSTEM

(75) Inventors: Kazuo Kuroda, Saitama-ken (JP);
Shoji Taniguchi, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/660,886

(22) Filed: Sep. 13, 2000

Related U.S. Application Data

(62) Division of application No. 09/061,959, filed on Apr. 17, 1998, now Pat. No. 6,144,625.

(30) Foreign Application Priority Data

Apr. 25, 1997 (JP) .............................................. 9-123555

(51) Int. Cl.[7] .............................................. G11B 7/00
(52) U.S. Cl. ................. 369/53.23; 369/44.27
(58) Field of Search .................. 369/44.26, 44.27, 369/44.29, 53.2, 53.22, 53.23, 47.55, 53.31, 53.37, 53.41, 53.45, 124.07

(56) References Cited

U.S. PATENT DOCUMENTS 5,745,461 A * 4/1998 Kawasaki ............ 369/44.26 X
5,764,610 A * 6/1998 Yoshida et al. .......... 369/53.22
6,430,146 B1 * 8/2002 Miyamoto et al. ....... 369/275.3

FOREIGN PATENT DOCUMENTS

JP          04-355221         12/1992

OTHER PUBLICATIONS

Abstract of European Patent Publication No. 04355221, dated Dec. 9, 1992.
JP4259918—Abstract of "Optical Information Recording and Reproducing Device" published Sep. 16, 1992.
JP4123320—Abstract of "Optical Disk Device" Published Apr. 23, 1992.

* cited by examiner

*Primary Examiner*—Paul W. Huber
(74) *Attorney, Agent, or Firm*—Arent Fox Kintner Plotkin & Kahn

(57) ABSTRACT

An optical disc discriminating system comprises: a tracking error signal generating means adapted to generate a tracking error signal whose amplitude level varies with a groove depth of information tracks on an optical disc; a tracking servo means for directing a laser beam along an information track on the optical disc in accordance with the tracking error signal; a comparator adapted to compare the amplitude level of the tracking error signal supplied from the tracking error signal generating means with a reference level, with a tracking servo loop of the tracking servo means in an opened condition; a discriminating means adapted to discriminate the first and second groups of optical discs in accordance with a result from the comparator.

8 Claims, 8 Drawing Sheets

OPTICAL DISC DISCRIMINATING SYSTEM

This is a divisional application of U.S. patent application Ser. No. 09/061,959 filed Apr. 17, 1998, now U.S. Pat. No. 6,144,625.

BACKGROUND OF THE INVENTION

The present invention relates to an optical disc discriminating system, in particular to a system for discriminating a read-only disc such as a DVD-ROM (Digital Video Disc-Read Only Memory) and a writable disc such as a DVD-R (Digital Video Disc-Recordable).

FIG. 7 indicates a conventional system for discriminating the types of different optical discs to determine if it is a read-only disc such as a CD-ROM (Compact Disc-Read Only Memory) or a writable disc such as a CD-R (Compact Disc-Recordable).

In FIG. 7, a reference character D is an optical disc to be discriminated, 101 is an optical pickup, 102 is a spindle motor for rotating the optical disc D, 103 is a motor control circuit for controlling the rotation of the spindle motor 102, 104 is a head amplifier, 105 is a servo circuit, 106 is an information pit detector, 107 is a CPU (Central Processing Unit).

The optical disc D to be discriminated is mounted on a turntable (not shown) of the spindle motor 102 which rotates in accordance with a control signal from the motor control circuit 103. The motor control circuit 103, in accordance with a command from the CPU 107, compares a pulse signal (FG) having a frequency proportional to the motor rotation speed, with another pulse signal (FG) indicating a rotation speed previously set by a setting section 171 of the CPU 107, so as to produce a frequency difference between these two pulse signals. Then, a control signal for rendering the frequency difference to become zero is fed to the spindle motor 102. In this manner, a servo loop is formed for controlling the rotation of the optical disc D. Therefore, the optical disc D which is to be discriminated later is controllably rotated at a speed previously set by the CPU 107.

On the other hand, a laser beam irradiating from the optical pickup 101 is reflected on the recording surface of the optical disc D (to be discriminated), a reflection diffraction light bearing the information from the optical disc D is received by a photodetector (not shown) of the optical pickup 101. Then, the reflection diffraction light is converted into an electric signal to be fed to the head amplifier 104. The head amplifier 104 processes the above electric signal so as to first produce and then amplify a RF signal and an error signal to be used in focusing control/tracking control. The amplified signals are fed to the servo circuit 105 and the information pit detector 106. The servo circuit 105, in view of an error signal applied hereto and in accordance with an command from the CPU 107, produces a servo control signal for controlling a slid motor (not shown) which may effect a radial movement of the optical pickup 101, a focus actuator (not shown) and a tracking actuator (not shown) both of which are contained in the optical pickup 101. Further, the servo circuit 105 produces a tracking lock signal (indicating a condition determined by a tracking control operation after the tracking servo loop is closed) to the information pit detector 106. The information pit detector 106 extracts an envelope of the RF signal, and determines whether the envelope has a higher level than a predetermined level. If the envelope has a higher level than a predetermined level, the pit detector 106 produces a signal (indicating that the optical disc D has formed thereon information pits) to the CPU 107.

The types of different optical discs may be discriminated with the use of the system of FIG. 7 in a manner which will be described in detail below.

At first, the CPU 107 gives a command to the servo circuit 105 to drive a slide motor (not shown) so as to move the optical pickup 101 in a radial direction to a position corresponding to a TOC (Table of Contents) area on the optical disc D. Then, the CPU 107 produces a command signal to the motor control circuit 103 to cause the optical disc D to rotate in a predetermined speed. Subsequently, a laser beam is emitted from the optical pickup 101, a focus control and a tracking control are effected by means of the servo circuit 105 such that the laser beam is converged on the information recording surface of the optical disc D and trace along information tracks thereon. After that, if the pit detector 106 has produced a signal indicating that the optical disc D has information pits formed thereon, it is determined that the optical disc D is a read-only CD or a finalized CD-R which does not contain any unrecorded portions. On the other hand, if the pit detector 106 does not produce such a signal, it is determined that the optical disc D is a CD-R which contains un-recorded portions.

A principle for discriminating the types of different optical discs in the above system of FIG. 7 may be explained as follows.

Namely, a CD-ROM or a finalized CD-R, which is a read-only optical disc, has formed in its TOC area a lot of pits representative of TOC information. Thus, when tracks are traced a RF signal will be read out which has an envelope whose level will be higher than a predetermined level, thereby producing a signal indicating that pits have been detected. On the other hand, a CD-R which contains unrecorded portions has not formed in its TOC area any pits representative of TOC information (because contents to be recorded have not yet been finally decided and thus the disc itself has not been finalized), although when tracks are traced a RF signal will be read out, an envelope of the RF signal will have a level which equals to zero, hence failing to produce any signal indicating that pits have been detected.

Recently, there has been developed a further advanced optical disc such as a read-only DVD-ROM (Digital Video Disc-Read Only Memory) which has a much larger information recording capacity and a higher recording density than a read-only CD. Also, there have been developed further advanced writable optical discs including a DVD-R (Digital Video Disc-Recordable), DVD-RAM (Digital Video Disc-Random Access Memory), which have an identical signal format as the read-only DVD-ROM but can optionally record movies or music a user has selected. Further, it has been suggested that a general system be designed to enable the DVD, DVD-R and DVD-RAM to be used so as to perform recording or reproducing on only one recording/reproducing device. With such a general system, it is necessary to discriminate the types of different optical discs so as to perform a desired changeover into an equivalent circuit having a characteristic corresponding to an optical disc to be used for recording or reproducing.

However, as shown in FIG. 8, when pit height or groove depth of an optical disc is $\lambda/4n$ ($\lambda$ is a wave length of a laser beam, n is an index of refraction of a substrate of an optical disc), an RF signal from the optical disc will reach a maximum level, thus a C/N (Carrier to Noise) of the RF signal is in its optimum condition. On the other hand, a push-pull signal (tracking error signal) indicating a difference between two outputs from a two-section (equally divided) photo-detector will become maximum when pit height or groove depth is λ/8n, but will become minimum when the height or the depth is λ/4n.

Where an optical disc is a CD-ROM, a pit height or a groove depth is designed to be λ/6n, so as to obtain a RF signal having a level equal to or higher than a predetermined value, and at the same time to surely perform a tracking control using a push-pull signal.

Where an optical disc is a DVD-ROM, since its recording density is seven times as high as a CD-ROM, an optical pickup, which is to be used in the above-described general system, has to be designed with an extremely high precision so as to meet the requirements prescribed in MTF (Modulation Transfer Function). In order to reduce a burden on the designing of such an optical pickup which is for use in the general system, the height of the pits formed on the DVD-ROM is designed to be λ/4n so as to obtain a RF signal having an optimum signal quality. Consequently, as a tracking control on the DVD in a comprehensive general system, it is impossible to employ a Push-pull Method, rather it is generally possible to employ a Phase Difference Method.

On the other hand, where an optical disc is a writable disc such as a DVD-R or a DVD-RAM, the recording of information on such an optical disc usually requires that a laser beam should have a high output power. Thus, it is preferable that a laser beam being emitted from a light source be used as efficiently as possible. Accordingly, as a tracking control on the DVD-R, it is preferable to employ a Push-pull Method which does not need to divide a laser beam, or allows a divided beam (for use in tracking control) to be much smaller than a beam for use in recording information. In contrast, the Phase Difference Method is not suitable for a DVD-R or a DVD-RAM, although the method allows a divided beam (for use in tracking control) to be smaller than a beam for recording information, because there are no pits formed on an unrecorded portions of a writable disc, making it impossible to obtain error signal. Further, in order to make a good trade-off (a balance) between the push-pull signal and the RF signal, a pit height or a groove depth is required to be approximately λ/5n so as to ensure that both the push-pull signal and RF signal reach or exceed their predetermined levels.

As is understood from the above description, a tracking control using Push-pull Method can not be used for a read-only optical disc such as a DVD-ROM, on the other hand, a tracking control using Phase Difference Method can not be used for a writable optical disc such as a DVD-R or a DVD-RAM.

Since there is no common tracking control which is useful for both a DVD-ROM and a DVD-R (or DVD-RAM), a conventional discriminating method can not be used for discriminating a DVD-ROM from a DVD-R (or DVD-RAM), because a conventional method requires a prerequisite that a tracking control be performed to render a laser beam to correctly trace tracks on an optical disc.

Moreover, in discriminating a DVD-R or a DVD-RAM having unrecorded portions, a conventional method (which discriminates a DVD-R or a DVD-RAM by confirming if there are information pits formed on the TOC area of an optical disc) fails to be used therefor because there are not information pits formed on the TOC area of a DVD-R or a DVD-RAM

SUMMARY OF THE INVENTION

It is an object of the present invention to provide an improved system for discriminating the types of different optical discs even if there is no common tracking control useful for optical discs of different types, so as to solve the above-mentioned problems peculiar to the above-mentioned prior arts.

According to the present invention, there is provided an optical disc discriminating system adapted to discriminate a first group of optical discs each formed with information tracks having a predetermined groove depth and a second group of optical discs each formed with information tracks having a different groove depth. The discriminating system comprises: a tracking error signal generating means adapted to generate a tracking error signal whose amplitude level varies with a groove depth of information tracks on an optical disc; a tracking servo means for directing a laser beam along an information track on the optical disc in accordance with the tracking error signal; a comparator adapted to compare the amplitude level of the tracking error signal supplied from the tracking error signal generating means with a reference level, with a tracking servo loop of the tracking servo means in an opened condition; a discriminating means adapted to discriminate the first and second groups of optical discs in accordance with a result from the comparator.

In one aspect of the present invention, an optical disc discriminating system may be made adapted to discriminate from the second group of optical discs a specific optical disc which has information tracks wobbled with a wobble signal having a predetermined frequency and has prepits formed between adjacent tracks on the optical disc. Thus, the discriminating system further comprises: an extractor for extracting the above wobble signal and/or a prepit detector for detecting the above prepits; a discriminating means adapted to discriminate a specific optical disc from the second group of optical discs, in accordance with output signal(s) fed from the above extractor and/or a prepit detector when the tracking servo loop of the tracking servo means is in a closed condition.

The above objects and features of the present invention will become more understood from the following description with reference to the accompanying drawings.

DETAILED DESCRIPTION OF THE PREFERRED EMBODIMENTS

Figure 1:
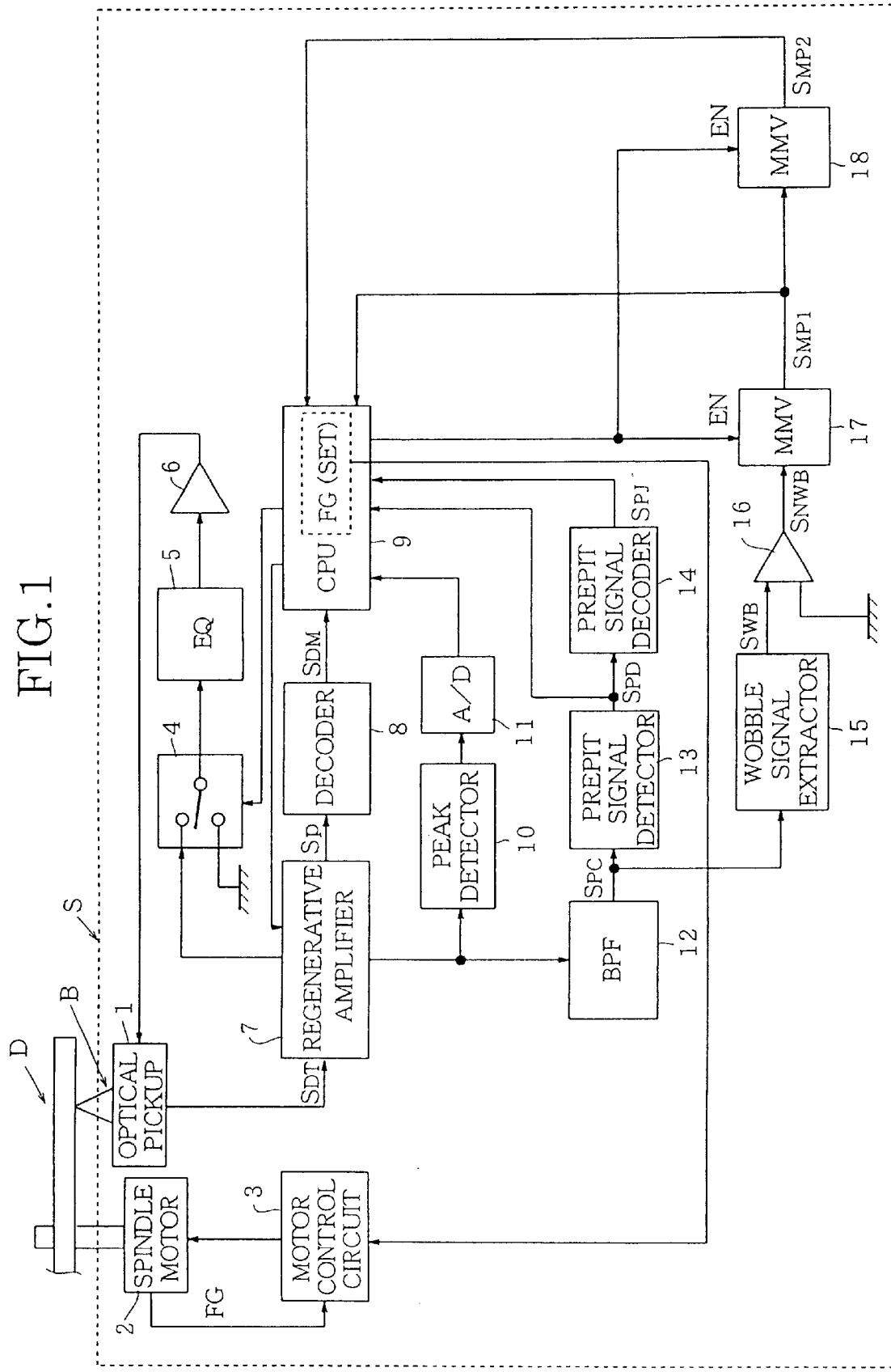
FIG. 1 is a block diagram showing an optical disc discriminating system formed according to the present invention.

In FIG. 1, a reference character D is an optical disc to be discriminated, S is an optical disc discriminating system of the present invention for discriminating the type of the optical disc D.

The optical disc D to be discriminated in the discriminating system of FIG. 1 will be described below.

Firstly, the optical disc D may be a read-only disc such as a DVD-ROM which has a pit height or a groove depth of λ/4n with respect to a laser beam having a wave length of 635 nm. Secondly, the optical disc D may be a writable disc such as a DVD-R or a DVD-RAM which does not have a pit height or a groove depth of λ/4n with respect to a laser beam having a certain wave length.

The recording format of information recorded on a DVD-ROM is described in the following.

The information recorded on a DVD-ROM is divided into a plurality of sync-frames each serving as an information unit. Every twenty six sync-frames form one recording sector, and every sixteen recording sectors form one ECC (Error Correcting Code) block. In detail, each sync-frame has a length which is 1488 times as long as a unit length (hereinafter referred to as T) corresponding to a pit interval. Further, a synchronizing signal SY having a length of 14T which is for obtaining a synchronizm with each sync-frame, is recorded on the front portion of each sync-frame.

Figure 3:
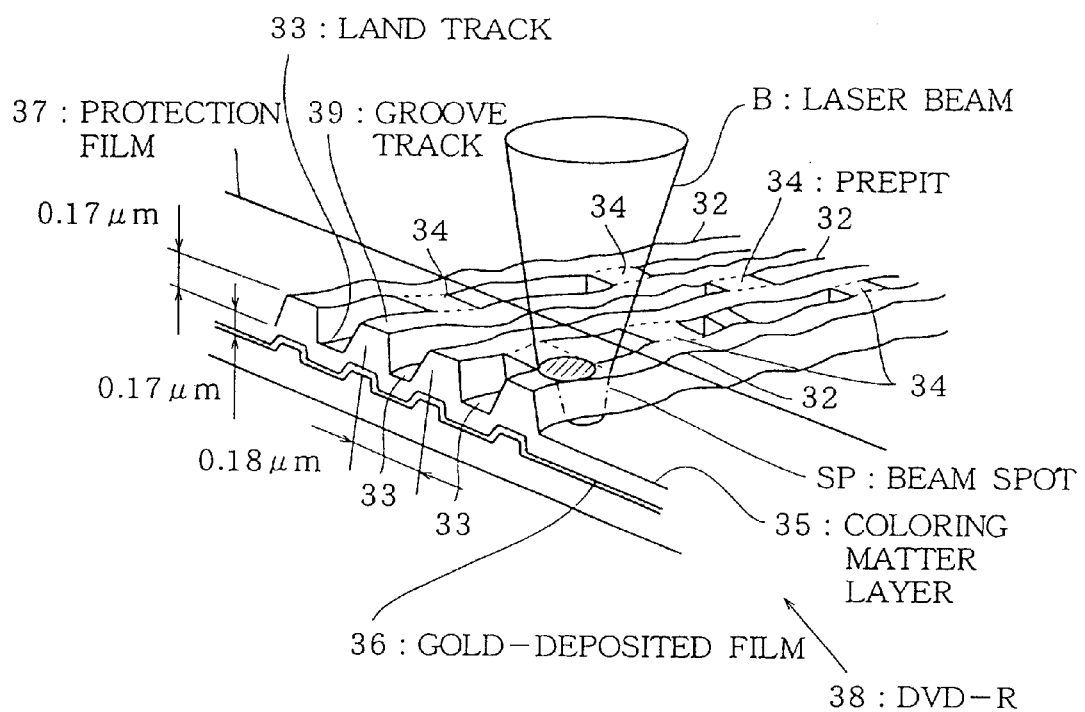
FIG. 3 is an enlarged perspective view showing the structure of a DVD-R to be discriminated in the system of the present invention.

On the other hand, a writable DVD-R 38 is formed with a coloring matter layer 35, as shown in FIG. 3. Referring to FIG. 3, groove tracks 39 serving as information recording tracks, and land tracks 33 for leading a laser beam B along the groove tracks 39 are all formed on the disc. Further, a protection film 37 and a gold-deposited film 36 (serving as a reflecting layer) are formed on the opposite sides of the disc.

Formed in and along each land track 33 are a plurality of prepits 34 (separated from each other at a predetermined interval) corresponding to pre-information.

Further, on the DVD-R 38 shown in FIG. 3, the groove tracks 39 are formed in a wobbled manner in accordance with a frequency (140 KHz) corresponding to the rotating speed of the DVD-R.

The recording format of pre-information recorded on a DVD-R 38 is described in the following.

The pre-information recorded on the DVD-R are in fact recorded on a plurality of sync-frames each serving as an information unit. Each cync-frame has recorded thereon a synchronizing signal SY. A land track 33 has formed therein one prepit 34 (adjacent to the synchronizing signal SY) serving to indicate a synchronizing signal in pre-information. Further, the land track 33 has formed therein two or one prepit 34 (adjacent to the front half of a sync-frame, other than the above synchronizing signal SY) serving to indicate address data of pre-information to be recorded on the land track 33. In this embodiment, prepits 34 are formed to have pre-information recorded on only even-numbered cync-frames or only on odd-numbered cync-frames in one recording sector. Therefore, within one recording selector, every two cync-frames (having a periodic interval of about 115 μs) have at least one prepit serving to indicate a cynchronizing signal.

When information (such as picture data other than pre-information) is to be recorded on the DVD-R 38, a wobbling frequency of the groove track 39 is extracted so as to obtain a clock signal (for controlling information recording) synchronized with the rotation of DVD-R 38. At the same time, pre-information is obtained by detecting prepits 34, a laser beam B is then adjusted to have the most appropriate output power in accordance with the pre-information. Meanwhile, address data indicating various positions on the DVD-R 38 is obtained, so that the information (such as picture data) is recorded on certain position on the DVD-R 38 in accordance with the address data. However, the depth of the groove tracks 39 is not λ/4n, but λ/5n so as to ensure that both the push-pull signal and RF signal reach or exceed their predetermined levels. In fact, the depth of groove tracks of DVD-R is shallower than the pit height of a DVD-ROM.

Figure 4:
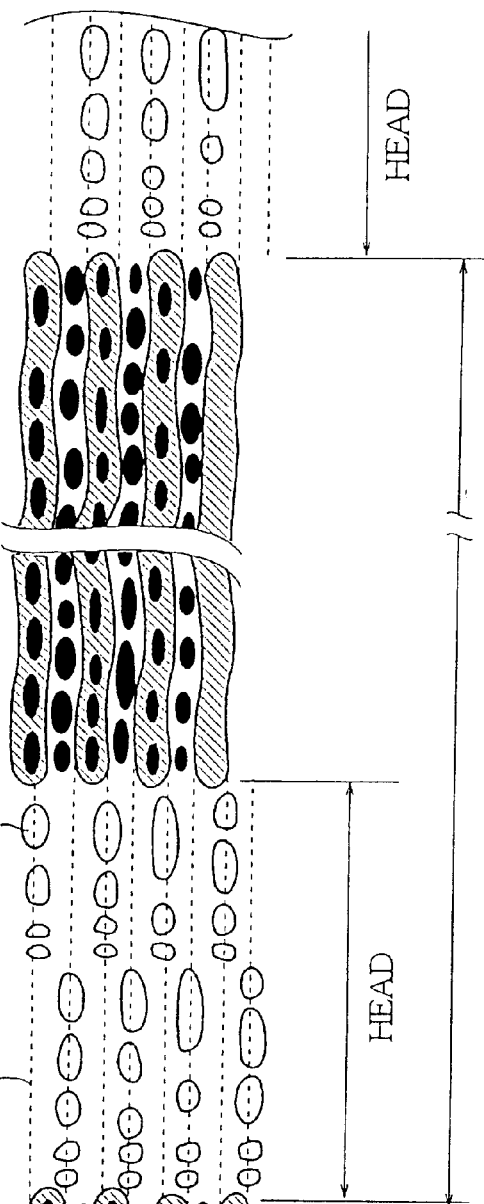
FIG. 4 is an explanatory view showing the structure of a DVD-RAM to be discriminated in the system of the present invention.

On the other hand, if a writable optical disc is a DVD-RAM (DVD-Random Access Memory), such as a repetitive writable/erasable optical disc made of a phase-changeable optical memory material shown in FIG. 4. Referring to FIG. 4, groove tracks and land tracks are alternatively arranged on the disc. On the front portion of each recording sector, there is formed an information recording area (called "head") for recording pre-information such as address information. Such pre-information are formed in terms of prepits along straight lines (dotted lines in FIG. 4). Similar to a DVD-R, the depth of groove tracks of DVD-RAM is shallower than the pit depth of a DVD-ROM.

Further, the groove tracks are formed in a wobbled manner in accordance with a frequency (140 KHz) corresponding to the rotation speed of the DVD-RAM, except on the "head" portion of each recording sector.

The optical disc discriminating system S according to the present invention will be described in detail below with reference to FIG. 1.

Referring to FIG. 1, the system S includes an optical pickup 1, a spindle motor 2, a motor control circuit 3, a switch 4, an equalizer 5, an amplifier 6, a regenerative amplifier 7, a decoder 8, a peak detector 10, an A/D converter 11, a band pass filter (BPF) 12, a prepit signal detector 13, a prepit signal decoder 14, a wobble signal extractor 15, a comparator 16, a MMV (Monomultivibrator) 17, and a MVV 18.

Figure 2:
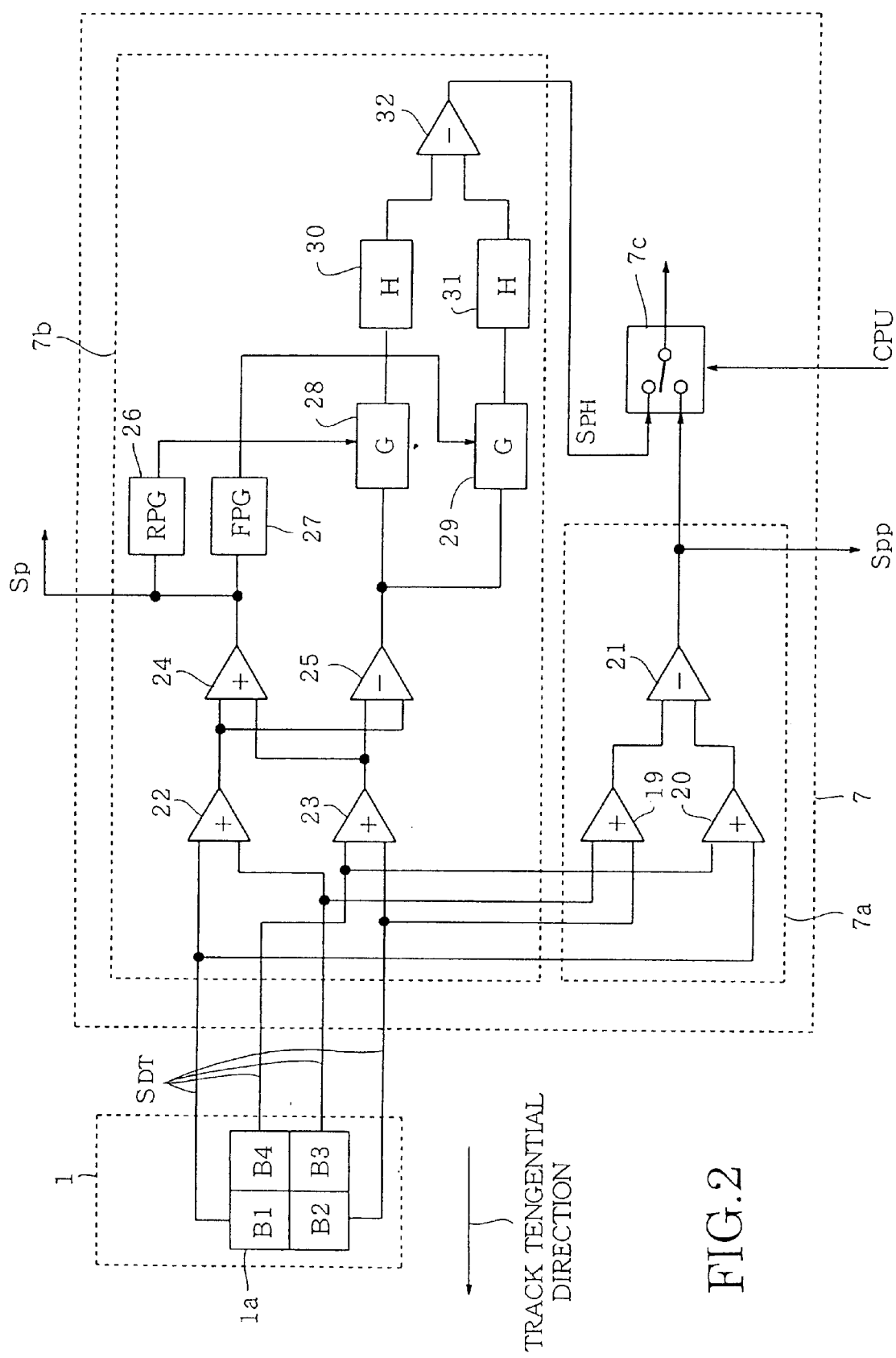
FIG. 2 is a schematic diagram indicating in detail a regenerative amplifier for use in the system of the present invention.

FIG. 2 is a schematic diagram indicating in detail the regenerative amplifier 7. Referring to FIG. 2, the regenerative amplifier 7 comprises a push-pull signal generator 7a, a phase difference signal generator 7b, and a switch 7c.

As shown in FIG. 2, the push-pull signal generator 7a is adapted to produce a push-pull error signal S PP using a Push-pull Method in accordance with detected signals S DT fed from a 4-divided photodetector 1a provided on the optical pickup 1. The phase difference signal generator 7b is adapted to produce a phase difference error signal S PH using a Phase Difference Method in accordance with a RF signal S P which is an overall signal of the detected signals S DT fed from the 4-divided photodetector, also directly in accordance with the detected signals S DT.

Although not shown in FIG. 1, the optical pickup 1 includes a laser diode, a beam spliter, an objective lens, a photodetector 1a. The optical pickup 1, in response to a drive signal, irradiates a laser beam B on to the information recording surface of the optical disc D. A reflected light is detected by the photodetector 1a which produces signals S DT to be supplied to the regenerative amplifier 7.

The motor control circuit 3 is adapted to control the rotation of the optical disc D by rendering the spindle motor 2 to rotate in a speed corresponding to an FG signal fed from CPU 9.

Figure 8:
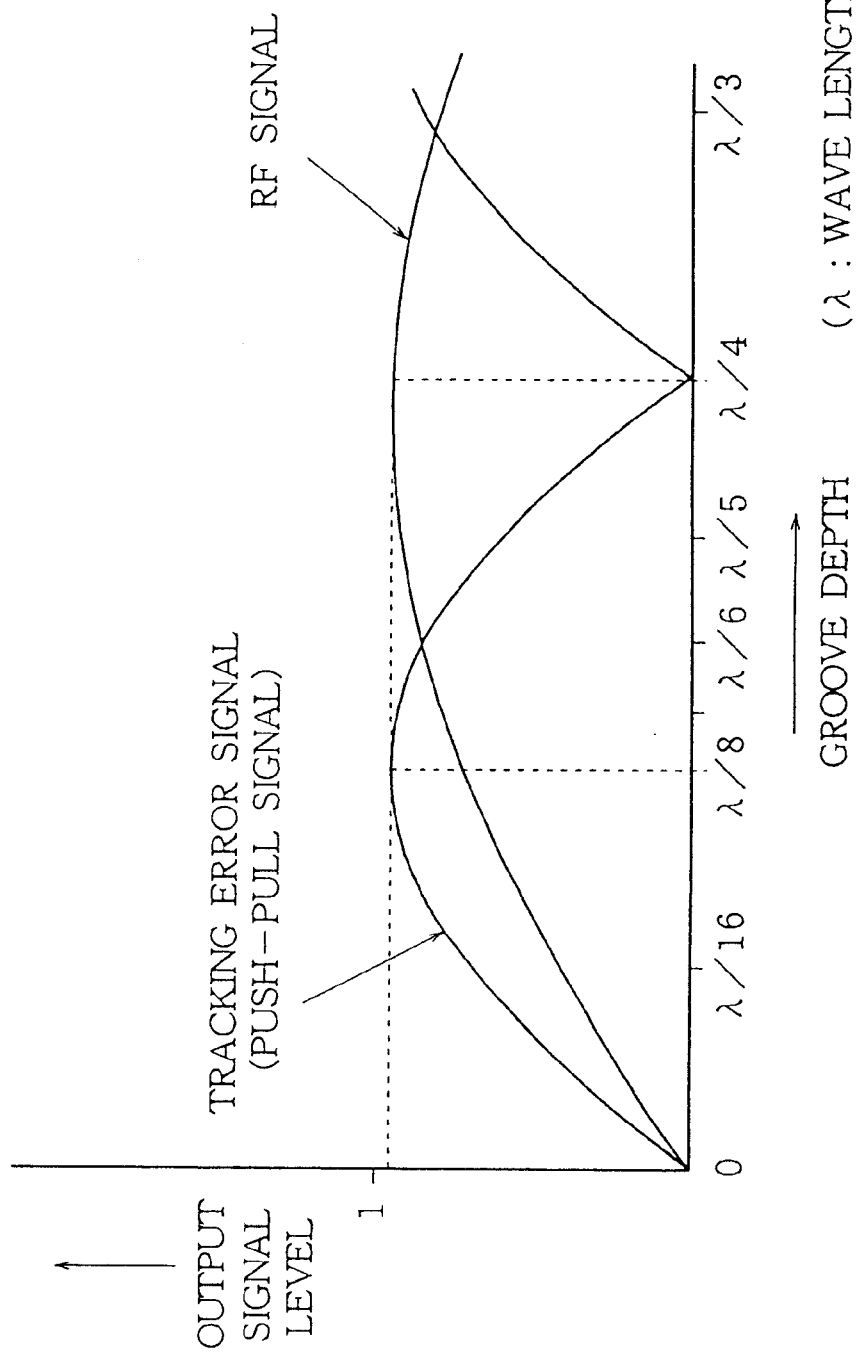
FIG. 8 is a graph showing a relationship between a pit depth and the level of RF signal, and a relationship between a pit depth and the level of a tracking error signal produced in a Push-pull method.

Referring again to FIG. 2, the push-pull signal generator 7a of the regenerative amplifier 7 comprises adders 19, 20 and a subtractor 21. The adder 19 is adapted to add together two output signals from sections B2 and B3 of the photodetector 1a to produce a sum signal, the adder 20 is adapted to add together two output signals from sections B1 and B4 of photodetector 1a to produce another sum signal. The sutractor 21 is adapted to produce a difference signal between the two sum signals from the adders 19, 20. In fact, the difference signal is a push-pull error S PP signal which is then supplied to the peak detector 8, the band pass filter 12, the prepit signal detector 13, and the switch 7c. However, such a push-pull error signal S PP is also a tracking error signal whose signal level changes with the groove depth of an optical disc, as shown in FIG. 8.

Referring further to FIG. 2, the phase difference signal generator 7b has adders 22, 23, 24, a subtractor 25. The adder 22 is adapted to add together two output signals from sections B1 and B3 of the photodetector 1a to produce a sum signal, the adder 23 is adapted to add together two output signals from sections B2 and B4 of photodetector 1a to produce another sum signal. The adder 24 is adapted to add together the two sum signals from the adders 22 and 23, so as to produce a RF signal S P which is then fed to the decoder 8 (FIG. 1), a rising pulse generator 26, a decay pulse generator 27. The rising pulse generator 26 is adapted to produce a pulse signal in synchronism with a positive amplitude period of RF signal S P fed from the adder 24, so as to supply the pulse signal as a gate pulse to the gate circuit 28. The decaying pulse generator 27 is adapted to produce a pulse signal in synchronism with a negative amplitude period of RF signal S P fed from the adder 24, so as to supply the pulse signal as a gate pulse to the gate circuit 29.

Meanwhile, the sutractor 25 is adapted to produce a difference signal between the two sum signals from the adders 22, 23. This difference signal is fed to gate circuits 28 and 29 as a signal (to be sampled), respectively. The gate circuit 28, during a period when a gate pulse is supplied from the rising pulse generator 26, will sample the above difference signal, and supply a sampled value to a hold circuit 30. Similarly, the gate circuit 29, during a period when a gate pulse is supplied from the decaying pulse generator 26, will sample the above difference signal, and supply a sampled value to a hold circuit 31. The output from the hold circuit 30 and the output from the hold circuit 31 are all supplied to a subtractor 32 so that a difference signal is produced. Such a difference signal is used as a phase difference error signal S PH (which is also a tracking error signal in a Phase Difference Method) to be fed to the switch 7c.

The switch 7c, in response to a changeover signal from the CPU 9, supply either a push-pull error signal S PP or a phase difference error signal S PH to the switch 4 (FIG. 1).

The switch 4 is adapted to open or close a tracking servo loop for the disc discriminating system. In detail, the switch 4, which operates in accordance with a command form the CPU 9 for opening or closing the tracking servo loop, will supply a tracking error signal fed from the switch 7 to the equalizer 5.

The equalizer 5 is adapted to perform a predetermined wave equalization so that either of the above error signals will be processed to have a desired frequency characteristic and be fed to the amplifier 6. The amplifier 6 is adapted to amplify the error signal to a predetermined desired level and supply the amplified signal to the optical pickup 1. In fact, the amplified signal serves as a drive signal for driving a tracking actuator (not shown) provided in the optical pickup 1.

On the other hand, the decoder 8 is adapted to perform predetermined demodulation and deinterleave on the RF signal S P fed from the regenerative amplifier 7 so as to decode the RF signal S P, and supply a demodulated signal S DM to the CPU 9.

The peak detector 10 is adapted to detect a peak level of the push-pull error signal S PP and to hold the peak level so as to supply the peak level to the A/D converter 11. In the A/D converter 11, the peak level is converted into a digital value which is then fed to the CPU 9. The CPU 9, in response to the digital value and in accordance with a predetermined procedure, will determine the type of an optical disc.

Meanwhile, the band pass filter 12 is adapted to remove noise components contained in the push-pull error signal fed from the regenerative amplifier 7, so as to produce a composite signal S PC which is then supplied to the prepit signal detector 13 and the wobble signal extractor 15.

If the tracking servo is in its closed condition and an optical disc D to be discriminated is a DVD-R, the composite signal S PC will be an overlapped signal in which a pulse signal caused due to prepits formed in the land tracks is overlapped on a wobbling signal from groove tracks). On the other hand, if an optical disc to be discriminated is a DVD-RAM, a pulse signal caused due to prepits and in synchronism with the head portion (having prepits) of each recording sector, and a wobble signal from the groove tracks, will be intermittently generated alternatively and periodically.

Further, the prepit signal detector 13 includes a comparator adapted to compare the composite signal S PC with a predetermined reference value, capable of extracting from the composite signal S PC a pulse signal generated due to prepits formed on a DVD-R or a DVD-RAM, producing a prepit detection signal S PD (which is a two-value signal only indicating a high or low value) to be fed to the CPU 9 and the prepit signal decoder 14.

The prepit signal decoder 14 is adapted to demodulate the prepit detection signal S PD so as to produce a pre-information decoded signal S PJ (indicating pre-information recorded on a writable optical disc) to the CPU 9.

On the other hand, the wobble signal extractor 15, also acting as a limiter, is adapted to remove from the composite signal S PC the pulse signal and noise signal mixed with the wobble signal, so as to produce a extracted wobble signal S WB which is then supplied to the comparator 16.

The comparator 16 is adapted to compare the extracted wobble signal S WB with a predetermined threshold value (a reference value) so as to produce a two-value wobble signal S NWB in synchronism with the period of the extracted wobble signal S WB. The wobble signal S NWB is then fed to MMV 17.

The MMV 17 is adapted to produce a pulse signal S MP1 which will reach a high level H in synchronism with a rising edge of the two-value wobble signal S NWB. The pulse signal S MP1 is then fed to the CPU 9 and the MMV 18. Here, the pulse signal S MP1 has a longer time period than that of a wobble signal period (about 7.2 $\mu$s) of DVD-R or a DVD-RAM. Further, the MMV 17 is so constructed that during a period a pulse signal S MP1 is occurring, once the rising edge of a next two-value wobble signal is inputted hereto, a further pule signal S MP1 having a predetermined time period will be generated from that time point. Therefore, when groove tracks are continuously formed over entire circumference of an optical disc, a pulse signal S MP1 may be maintained constantly at a high level.

The MMV 18 is adapted to produce a pulse signal S MP2 which will reach a high level in synchronism with a rising edge of the signal S MP1. The pulse signal S MP2 is then fed to the CPU 9. Here, the pulse signal S MP2 has a longer time period than that of one recording sector period (about 1.48 ms) of DVD-RAM. Further, the MMV 18 is so constructed that during a period a pulse signal S MP2 is occurring, a pulse signal S MP1 will not be accepted even if it is supplied hereto. Therefore, with a pulse signal S MP2, there will occurs a decaying edge after a time period (set to be longer than one recording sector period) has passed.

The CPU 9, in accordance with a demodulated signal S DM, is adapted to supply through an interface circuit (not shown) reproduction signals corresponding to digital signals recorded on an optical disc, and to control the optical disc discriminating system S as a whole.

As understood from the above description, the CPU 9 is adapted to discriminate the type of an optical disc through its operations involving the use of the prepit detected signal S PD, the pre-information decoded signal S PJ, the pulse signal S MP1, the pulse signal S MP2, and the peak level of the push-pull signal fed from the A/D converter 11.

An operation of the optical disc discriminating system S according to the present invention, will be described in the following with reference to FIG. 5.

Figure 5:
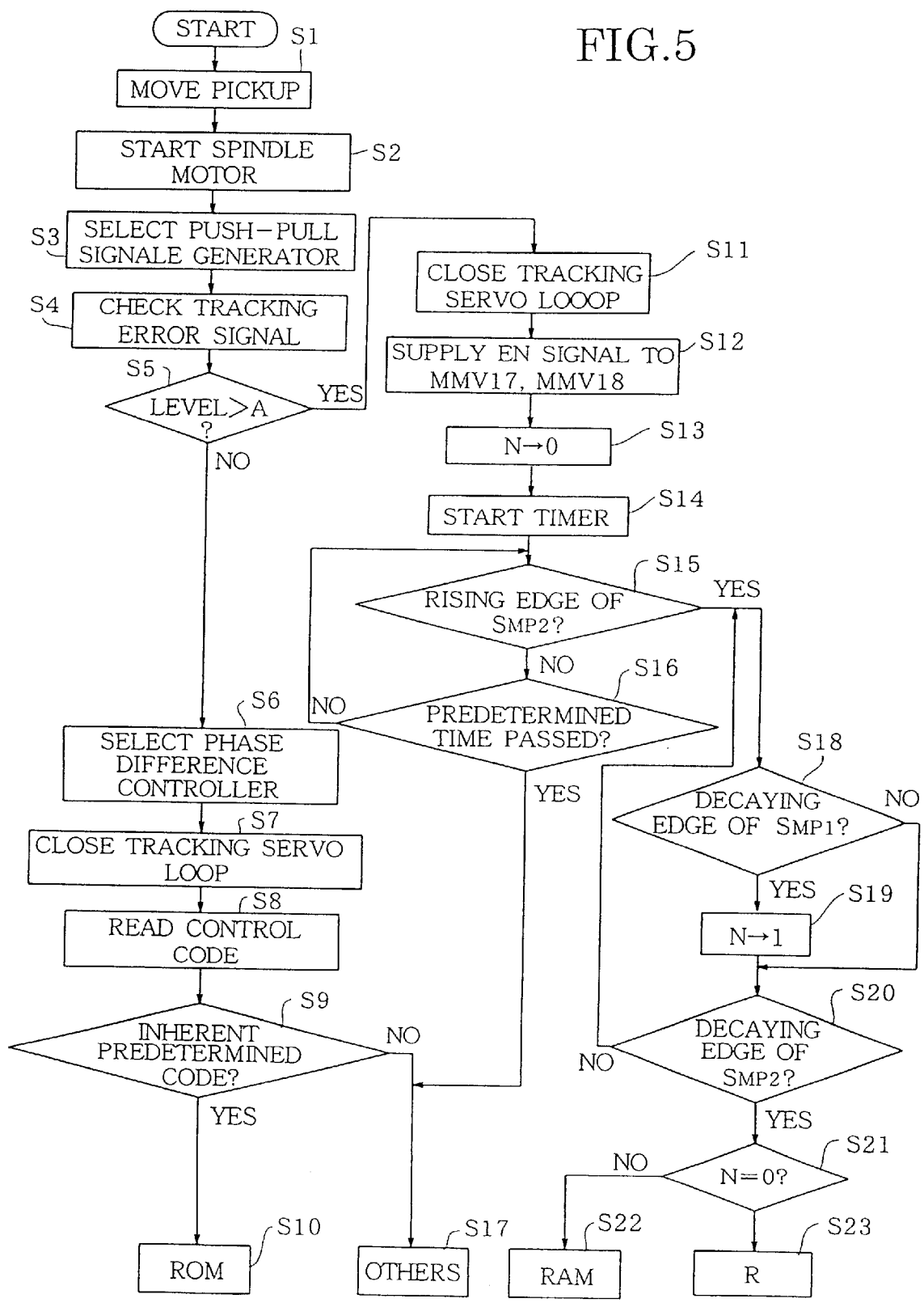
FIG. 5 is a flowchart showing an operation of a CPU in the system of the present invention.

FIG. 5 is a block diagram showing a flowchart of an operation of the CPU 9 for discriminating the type of an optical disc. However, it is assumed that at this moment a focus control on the laser beam irradiating from the optical pickup 1 has been performed, whilst a tracking control has not been performed yet with the switch 4 in its opened position.

Referring to FIG. 5, at step S1, the CPU 9 operates to move the optical pickup 1 to a predetermined position on an optical disc D (for example, a position adjacent to an inmost circumference of a recording area). At step S2, the CPU 9 operates to supply an FG data (corresponding to the above position on the optical disc D) to the rotation control circuit 3 so as to start the rotation of the spindle motor 2.

At step S3, a changeover signal is supplied from the CPU 9 to the switch 7c to render the switch 7c to be connected to the push-pull signal generator 7a.

At step S4, an output signal from the A/D converter 11 is fed to the CPU 9 to check the level of a push-pull signal S PP.

At step S5, the CPU 9 determines whether a digital value indicating an amplitude level of a push-pull signal fed from the A/D converter 11 is higher than a predetermined value (reference value A). If the digital value is not higher than the reference value A, the optical disc is supposed to be a read-only DVD-ROM, thus the program transfers to step S6. Namely, if an optical disc is a DVD-ROM, since its pit height (or groove depth) is λ/4n, the amplitude level of the push-pull error signal will be almost zero regardless of a positional relationship between a laser beam spot and an information track on the disc. On the other hand, if an optical disc is a DVD-R or a DVD-RAM, since its pit height (or groove depth) is larger or smaller than λ/4n, a push-pull error signal will have a certain amplitude level corresponding to a positional relationship between a laser beam spot and an information track.

An step S6, the CPU 9 supplies a changeover signal to render the switch 7 to connect the phase difference controller 7b, so that a phase difference error signal S PH is fed to the switch 4.

At step S7, the CPU 9 supplies a switch closing signal to the switch 4 to close the switch 4, so as to start a tracking control on the laser beam B. At step S8, the CPU 9 gets an output signal (demodulation signal S MD) from the decoder 8 so as to read out a control code recorded on a predetermined area (such as a TOC area of a DVD-ROM) of an optical disc.

At step S9, it is determined whether the control code read out at step S8 is an inherent predetermined code of a DVD-ROM. If it is an inherent predetermined code of a DVD-ROM, the program transfers to step 10 to determine that the optical disc is a read-only disc DVD-ROM.

Afterwards, the CPU 9 operates to indicate that the optical disc is a read-only disc DVD-ROM, and to perform a changeover to a predetermined circuit suitable for the read-only disc DVD-ROM.

On the other hand, at step S9, if a control code read out at step S8 is not an inherent predetermined code of a DVD-ROM, the program transfers to step S17 to determine that the optical disc is neither a DVD-ROM nor a DVD-R or DVD-RAM, so as to stop all the possible operations after that.

Moreover, at step S5, if a digital value indicating an amplitude level of a push-pull error signal fed from the A/D converter 11 is higher than a predetermined value (reference value A), the program transfers to step S11. At step S11, a switch closing signal is supplied to the switch 4 to render the tracking servo loop to be in a closed condition. Then, the program transfers to step S12, the CPU 9 supplies an EN signal to each of the MMV 17 and the MMV 18 so as to render them in an operational condition.

At step S13 a discrimination flag N is set to be zero, and at step S14 a timer is started.

In step S15, a rising edge of a pulse signal S MP2 fed from the MMV 18 is detected.

At step 15, if a rising edge of a pulse signal S MP2 fed from the MMV 18 can not be detected, the program transfers to step S16 at which it is determined whether a predetermined time from the start of the timer has passed or not. If the predetermined time has not passed yet, the program goes back to step S15. At step S15, a rising edge of a pulse signal S MP2 fed from the MMV 18 is again detected. Similarly, if a rising edge of a pulse signal S MP2 fed from the MMV 18 can not be detected, the program transfers to step S16 again. Such a process is repeated until it is determined that the above predetermined time from the start of the timer has passed.

When it is determined at step S16 that the above predetermined time from the start of the timer has passed, the program transfers to step S17, to determine that the optical disc is neither a DVD-ROM nor a DVD-R or DVD-RAM, so as to stop all the possible operations after that.

At step S15, if a rising edge of a pulse signal S MP2 fed from the MMV 18 has been detected, the program transfers to step 18 to detect whether there has occurred a decaying edge in a pulse signal S MP1 fed from the MMV 17.

If there has occurred a decaying edge in a pulse signal S MP1 fed from the MMV 17, the program transfers to step S19. At step S19, the discrimination flag N is changed from zero to 1, and the program transfers to step 20.

On the other hand, at step S18 if a decaying edge in a pulse signal S MP1 can not be detected, the program transfers directly to step S20.

At step S20, it is determined whether there has occurred a decaying edge in a pulse signal S MP2 fed from the MMV 18. If a decaying edge in a pulse signal S MP2 can not be detected, the program goes back to step 18. In fact, the step 18 and the step S20 are repeated until it is determined that there has occurred a decaying edge in a pulse signal S MP2 fed from the MMV 18.

At step S20, if it is determined that there has occurred a decaying edge in a pulse signal S MP2 fed from the MMV 18, the program transfers to step S21 to confirm whether a discrimination flag N is 1 or not. If the discrimination flag N is 1, the program transfers to step S 22 to determine that the optical disc D is a DVD-RAM. On the other hand, if at step S21 the discrimination flag N is zero, the program transfers to step S23 so as to determine that the optical disc is a DVD-R.

Another operation of the optical disc discriminating system S, according to the present invention, will be described in the following with reference to FIG. 6.

Figure 6:
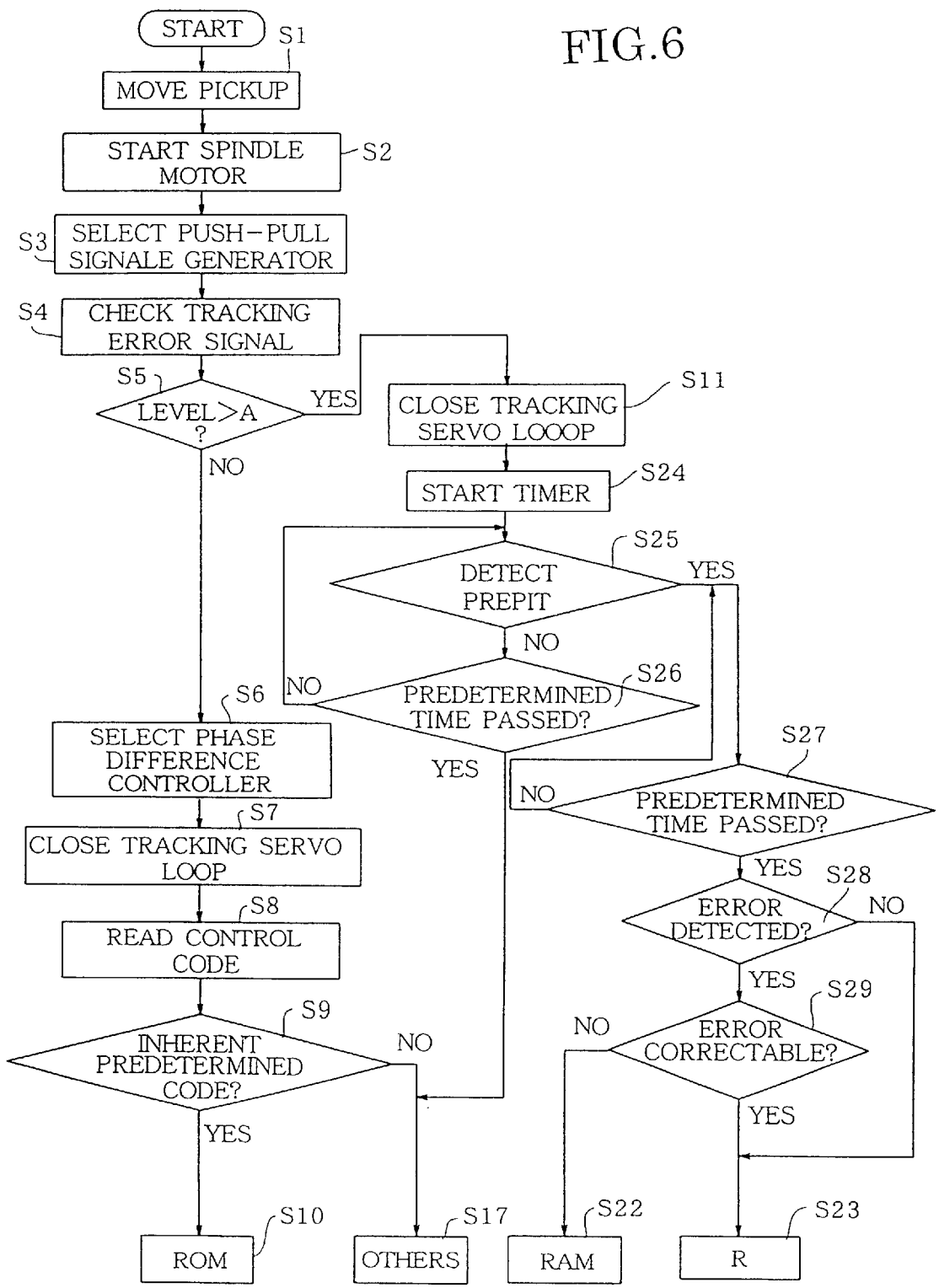
FIG. 6 is a flowchart showing another operation of a CPU in the system of the present invention.
Figure 7:
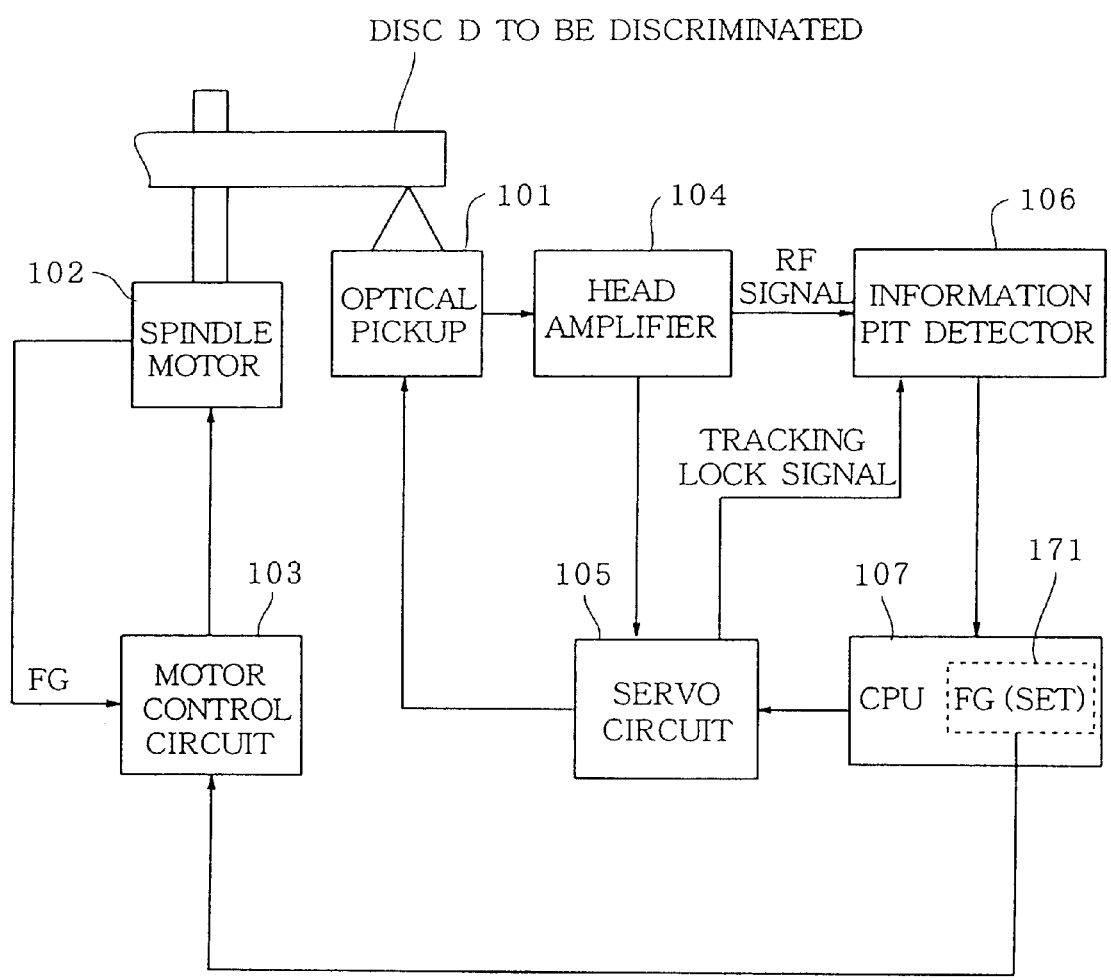
FIG. 7 is a block diagram showing an optical disc discriminating system according to a prior art.

FIG. 6 is a block diagram showing a flowchart of another operation of the CPU 9 for discriminating the type of an optical disc.

Referring to FIG. 6, at step S1, the CPU 9 operates to move the optical pickup 1 to a predetermined position on an optical disc D (for example, a position adjacent to an inmost circumference of a recording area). At step S2, the CPU 9 operates to supply an FG data (corresponding to the above position on the optical disc D) to the rotation control circuit 3 so as to start the rotation of the spindle motor 2.

At step S3, a changeover signal is supplied from the CPU 9 to the switch 7c to render the switch 7c to be connected to the push-pull signal generator 7a.

At step S4, an output signal from the A/D converter 11 is fed to the CPU 9 to check the level of a push-pull signal S PP.

At step S5, the CPU 9 determines whether a digital value indicating an amplitude level of a push-pull signal fed from the A/D converter 11 is higher than a predetermined value (reference value A). If the digital value is higher than the reference value A, the program transfers to step S11. At step S11, a switch closing signal is supplied to the switch 4 to render the tracking servo loop to be in a closed condition. In this way, the tracking servo loop is formed so as to perform a tracking control in accordance with the push-pull error signal supplied from the regenerative amplifier 7.

Then, the program transfers to step S24 at which a timer is started.

Afterwards, at step S25, it is determined whether a prepit detected signal S PD has been produced from the prepit signal detector 13 (indicating whether prepit has been detected from an optical disc which is to be discriminated). If prepit can not be detected from an optical disc, the program transfers to step S26. At step S26, it is determined whether a predetermined time from the start of the timer has passed or not. If it is determined at step S16 that the above predetermined time from the start of the timer has passed, the program transfers to step S17, to determine that the optical disc is neither a DVD-ROM nor a DVD-R or DVD-RAM, so as to stop all the possible operations after that.

On the other hand, if the predetermined time has not passed yet, the program goes back to step S25 at which it is determined whether prepit can be detected from an optical disc which is to be discriminated).

At step S25, if prepit has been detected, the program transfers to step S27. At step S27, it is necessary to wait until a time period has passed which is sufficient for reading minimum prepit signal to decode the prepit signal so as to obtain pre-information, by virtue of the prepit signal decoder 14.

At step S28, it is determined whether an error has been detected when performing decoding process in the prepit signal decoder 14. If an error can not be detected, the program transfers to step S23 in which the CPU 9 determines that the optical disc D is a DVD-R.

On the other hand, at step S28 if it is determined that an error was detected when performing decoding process in the prepit signal decoder 14, the program transfers to step 29 at which the CPU 9 determines whether the detected error can be corrected in accordance with the prepit signal format of a DVD-R. If it is determined that the detected error can be corrected in accordance with the prepit signal format of a DVD-R, it may be determined that the optical disc is a DVD-R.

On the other hand, at step S29 if it is determined that the detected error can not be corrected in accordance with the prepit signal format of a DVD-R, the program transfers to step S22 at which it may be determined that the optical disc is a DVD-RAM.

As may be understood from the above description, with the use of the optical disc discriminating system according to the present invention, an optical disc may be discriminated using a fact that a read-only disc and a writable disc have different groove depths and using the amplitude level of a push-pull error signal obtained when the tracking servo loop is in its opened condition. Therefore, it is possible to correctly perform disc discrimination even if optical discs to be discriminated are treated in different tracking error signal generating methods.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical disc discriminating system adapted to discriminate from other optical discs a specific optical disc which has information tracks wobbled with a wobble signal having a predetermined frequency and a head portion formed on a front portion of each recording sector, said discriminating system comprising:

a tracking error signal generating means for generating a tracking error signal;

a tracking servo means for directing a laser beam along an information track on the optical disc in accordance with the tracking error signal;

an extractor for extracting the wobble signal;

a comparator for comparing the wobble signal with a reference value;

a first pulse generator for producing a first pulse signal which has a longer time period than that of the wobble signal period, in synchronism with a output of the comparator;

a second pulse generator for producing a second pulse signal which has a longer time period than that of one recording sector period, in synchronism with the first pulse signal; and a discriminating means adapted to discriminate the specific optical disc from the other optical discs, in accordance with the first and second pulse signals when a tracking servo loop of the tracking servo means is in a closed condition.

2. The discriminating system according to claim 1, wherein said specific optical disc is a DVD-RAM which is a writable optical disc.

3. An optical disc discriminating system adapted to discriminate from other optical discs a specific optical disc which has information tracks wobbled with a wobble signal having a predetermined frequency and prepits formed between adjacent tracks, said discriminating system comprising:

a tracking error signal generating means for generating a tracking error signal;

a tracking servo means for directing a laser beam along an information track on the optical disc in accordance with the tracking error signal;

a prepit detector for detecting the prepits;

a decoder for demodulating a prepit detection signal outputted from the prepit detector and for extracting pre-information from the prepit detection signal or an error; and a discriminating means adapted to discriminate the specific optical disc, in accordance with output signals fed from the prepit detector and the prepit decoder when a tracking servo loop of the tracking servo means is in a closed condition.

4. The discriminating system according to claim 3, wherein said specific optical disc is a DVD-R which is a writable optical.

5. An optical disc discriminating method adapted to discriminate from other optical discs a specific optical disc which has information tracks wobbled with a wobble signal having a predetermined frequency and a head portion formed on a front portion of each recording sector, said discriminating method comprising the steps of:

generating a tracking error signal;

directing a laser beam along an information track on the optical disc in accordance with the tracking error signal;

extracting the wobble signal;

comparing the wobble signal with a reference value;

producing a first pulse signal which has a longer time period than that of the wobble signal period, in accordance with a result of the comparing;

producing a second pulse signal which has a longer time period than that of one recording sector period, in accordance with the first pulse signal; and discriminating the specific optical disc, in accordance with the first and second pulse signals.

6. The discriminating method according to claim 5, wherein said specific optical disc is a DVD-RAM which is a writable optical disc.

7. An optical disc discriminating method adapted to discriminate from other optical discs a specific optical disc which has information tracks wobbled with a wobble signal having a predetermined frequency and prepits formed between adjacent tracks, said discriminating method comprising the steps of:

generating a tracking error signal;

directing a laser beam along an information track on the optical disc in accordance with the tracking error signal;

detecting the prepits;

demodulating a prepit detection signal outputted from the prepit detector and extracting pre-information or an error; and discriminating the specific optical disc, in accordance with a result of the detecting and demodulating.

8. The discriminating method according to claim 7, wherein said specific optical disc is a DVD-R which is a writable optical disc.

* * * * *